United States Patent [19]

Martin

[11] Patent Number: 4,949,822

[45] Date of Patent: Aug. 21, 1990

[54] TORQUE CONVERTER ASSEMBLY WITH REVERSE ACTING BYPASS CLUTCH

[75] Inventor: Dale E. Martin, Novi, Mich.

[73] Assignee: Ford Motor Company, Dearborn, Mich.

[21] Appl. No.: 382,470

[22] Filed: Jul. 20, 1989

[51] Int. Cl.$^5$ ............................................. F16D 33/00
[52] U.S. Cl. ..................................... 192/330; 192/3.31
[58] Field of Search ...................... 192/3.28, 3.29, 3.3, 192/3.31

[56] References Cited

U.S. PATENT DOCUMENTS

| | | | |
|---|---|---|---|
| 2,351,483 | 6/1944 | Carnagua | 192/3.31 |
| 2,568,007 | 9/1951 | Jandasek | 192/3.31 |
| 2,607,456 | 8/1952 | Jandasek | 192/3.28 |
| 2,623,411 | 12/1952 | Herndon | 192/3.3 |
| 2,995,956 | 8/1961 | Moore | 192/3.3 |
| 3,002,593 | 10/1961 | Black et al. | 192/3.29 |
| 3,299,743 | 1/1967 | Stockton | 74/690 |
| 3,688,600 | 9/1972 | Leonard | 74/690 |
| 4,033,436 | 7/1977 | Hoetger et al. | 192/3.3 |
| 4,495,829 | 1/1985 | Kemper | 192/3.28 |

FOREIGN PATENT DOCUMENTS

| | | | |
|---|---|---|---|
| 2752357 | 6/1978 | Fed. Rep. of Germany | 192/3.3 |
| 3543013 | 6/1987 | Fed. Rep. of Germany | 192/3.3 |
| 856941 | 12/1960 | United Kingdom | 192/3.3 |

Primary Examiner—Leslie A. Braun
Assistant Examiner—Andrea Pitts
Attorney, Agent, or Firm—Donald J. Harrington; Frank G. McKenzie; Keith L. Zerschling

[57] ABSTRACT

A hydrokinetic torque converter assembly has a turbine and an impeller located in a converter housing and a lockup clutch construction in the converter housing that includes a one-piece stamped clutch and piston housing secured to the inner wall of the converter housing wherein the outer extremity of the stamped housing carries friction discs. An annular piston is located between the discs and the converter housing wherein the piston is stroked toward the turbine upon introduction of control pressure to a control chamber defined by the piston and the cylinder, the driven discs of the clutch being connected to a turbine shaft through a damper and the friction elements of the clutch being continuously exposed to circulating fluid within the converter wherein piston charge pressure is established without a requirement for continuous flow when the clutch is actuated.

3 Claims, 2 Drawing Sheets

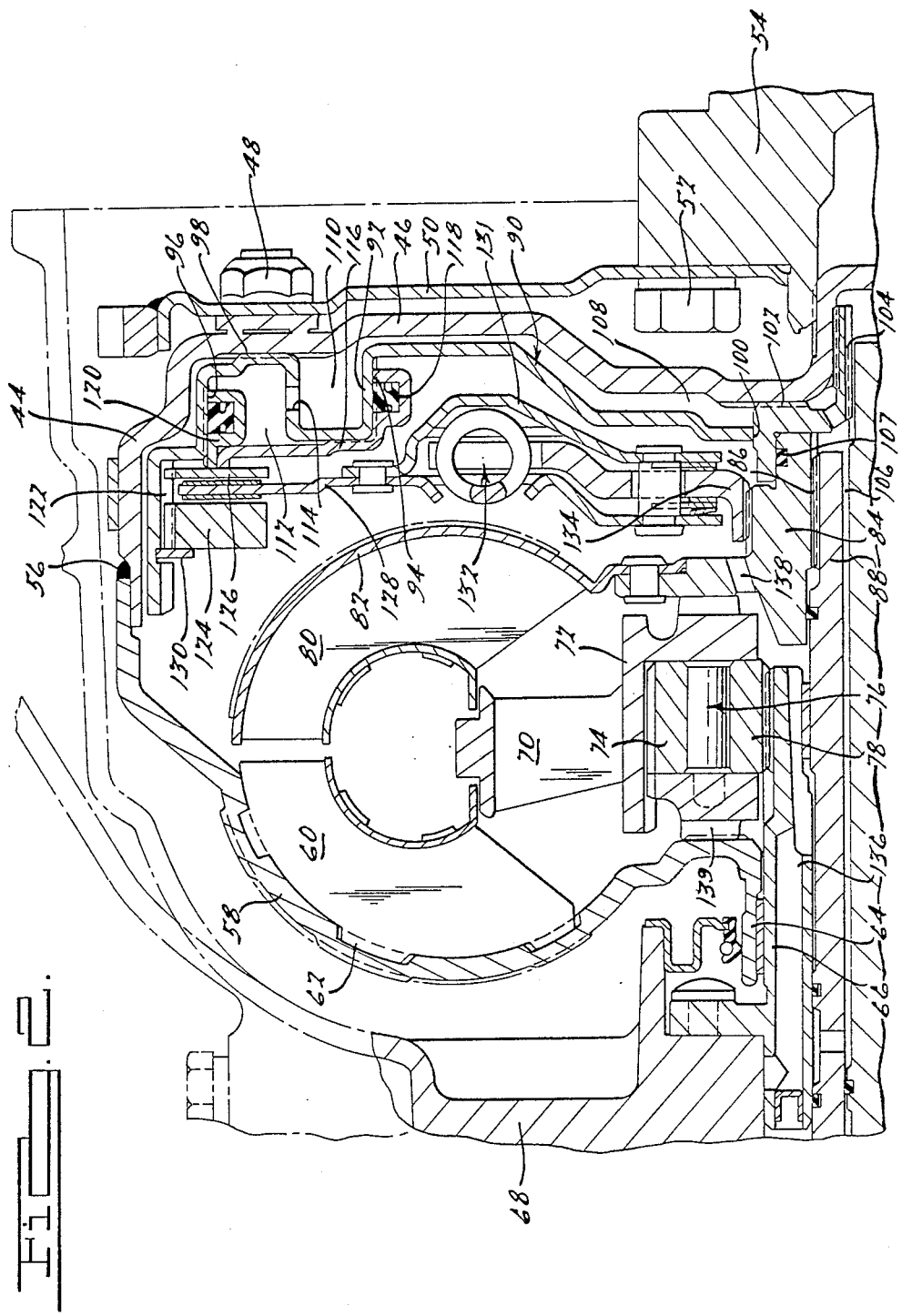

TORQUE CONVERTER ASSEMBLY WITH REVERSE ACTING BYPASS CLUTCH

BACKGROUND OF THE INVENTION

My invention comprises improvements in a hydrokinetic torque converter and lock-up clutch assembly of the kind shown, for example, in U.S. Pat. No. 4,509,389, which is assigned to the assignee of this invention. That patent describes a three-element torque converter including a turbine and an impeller located in a common converter housing wherein a clutch cavity is formed in the converter housing between the radial wall of the housing and the turbine, the radial wall of the housing being proximate to an engine crankshaft which is drivably connected to the impeller through the converter housing.

The construction of the '389 patent includes a friction disc in the form of a piston plate having a friction surface on its outer margin. The friction surface on the piston plate is adapted to engage a friction surface formed on an adjacent annular wall of the converter housing. The inner margin of the plate is supported by a turbine hub to which the turbine is connected. The piston plate, together with the adjacent wall of the converter housing, define a control pressure space which is pressurized with control fluid, thereby establishing radial fluid circulation across friction surfaces.

A damper assembly is used to connect drivably an outward radial portion of the piston plate to the turbine hub. Thus, when the clutch is applied, torque is distributed mechanically through the clutch from the engine crankshaft to the turbine, thus bypassing the hydrokinetic torque flow path through the torque converter. When the clutch is disengaged, all the torque is distributed from the crankshaft to the turbine shaft hydrokinetically, thus permitting hydrokinetic torque multiplication to occur when the torque converter operates in a torque multiplication mode.

The clutch is disengaged by increasing the control pressure in the cavity between the clutch plate and the adjacent wall. This causes cooling oil to circulate throughout the friction discs. That fluid is added to the flow of fluid in the torus cavity and circulated through the torous circuit into an oil cooler.

When the control pressure in the pressure cavity behind the piston plate decreases, the clutch is applied by controlling the control pressure. The degree of engagement may be controlled if continuous slipping is desired. The pressure may be modulated in accordance with the driving conditions to effect a continuous slip. This complements the cushioning action and the damping effect of the spring cushion and damper assembly that connects the drive plate to the turbine shaft.

U.S. Pat. No. 4,199,047 shows another lock-up clutch arrangement. That patent also is assigned to the assignee of this invention. Unlike the construction of the '389 patent, the construction of the '047 patent has a clutch piston plate that is stroked toward the turbine rather than toward the converter housing. A friction ring carried by the impeller housing at the outer extremity of the housing is situated directly adjacent the friction surface carried by the piston plate.

A portion of the fluid circulated through the torus circuit flows across the clutch surfaces and radially inward through a control pressure space between the impeller housing and the clutch plate. The flow through the control pressure space is radially inward in contrast to the radial outward flow in the construction of the '389 patent.

It is desired to apply the clutch described in the '047 patent, the control pressure is increased relative to the static pressure and the torus circuit. This also is in contrast to the mode of operation of the construction of the '389 patent where the control pressure in the control pressure cavity is decreased relative to the static pressure in the torus circuit upon application of the clutch.

In both of the constructions of the '047 and '389 patents, a continuous flow of fluid through the control pressure cavity is required during clutch disengagement. If continuous slipping is desired and if the control pressure in the control pressure cavity is controlled accordingly, continuous flow through the pressure cavity likewise is required.

BRIEF DESCRIPTION OF THE INVENTION

The improved construction of my invention is distinguished from the constructions of the '389 and '047 patents because continuous flow is not required to control the operation of the lock-up clutch. The lockup clutch of my design is located in a cavity within the converter housing. The cavity is situated between the converter housing wall proximate to the engine crankshaft and the turbine. The clutch comprises a piston that cooperates with a cylinder to define a pressure cavity wherein the piston is stroked toward the turbine rather than away from the turbine, as in the case of the construction of the '389 patent. Furthermore, continuous flow of fluid through the pressure cavity defined by the piston and the cylinder is not required regardless of whether the clutch is applied or released.

my improved clutch construction includes friction discs situated within the converter housing adjacent the turbine wherein a torque output disc is connected to the turbine hub through a damper assembly. The clutch discs are applied as the clutch piston is stroked toward the turbine.

I am aware of prior art constructions that employ annular pistons and a cooperating friction disc assembly in a torque converter housing wherein the piston is stroked toward the turbine and wherein continuous flow through the pressure cavity of the piston is not required. One example of such a prior art construction is shown in U.S. Pat. No. 2,709,926. Further examples are shown in U.S. Pat. Nos. 2,728,427 and 4,478,323. My improved construction is distinguished from the '926 patent, a well as the '427 and the '323 patents, because the cylinder of my construction that cooperates with the piston is formed as a single piece stamping and the stamping is secured to the inner wall of the converter housing most proximate to the engine crankshaft. Machining of the impeller housing or machining of the starter ring gear and fly wheel, which would be required in constructing the prior art devices, is not required in constructing the improved assembly of my invention. Furthermore, the clutch housing that supports the friction discs of the multiple clutch disc assembly is formed as a part of the one-piece stamping. The piston itself may be made of a simple stamping so that it may register with portions of the stamping that define the annular cylinder, thus defining a pressure cavity that can be pressurized by introduing a control pressure through internal passages without the requirement for establishing a continuous flow through the clutch.

My improved clutch construction is arranged so that the friction discs are located adjacent the turbine where they are continuously exposed to circuit fluid, thus effecting optimum cooling as energy is dissipated when the clutch is partially applied. It is possible when using my improved arrangement to increase or decrease the torque capacity for given dimensions of the clutch assembly by adding additional friction discs or substracting discs depending upon the torque requirements of a particular driveline.

In the embodiment of my invention described in this specification, a damper is used to connect a driven disc of a clutch assembly to the turbine hub, but in some applications it would be possible to eliminate the damper and to establish the cushion and damper functions by allowing the clutch to slip as pressure behind the annular piston is modulated appropriately.

BRIEF DESCRIPTION OF THE FIGURES OF THE DRAWINGS

FIG. 2 is a converter and lockup clutch assembly embodying the teachings of my invention.

PARTICULAR DESCRIPTION OF THE INVENTION

Figure 1:
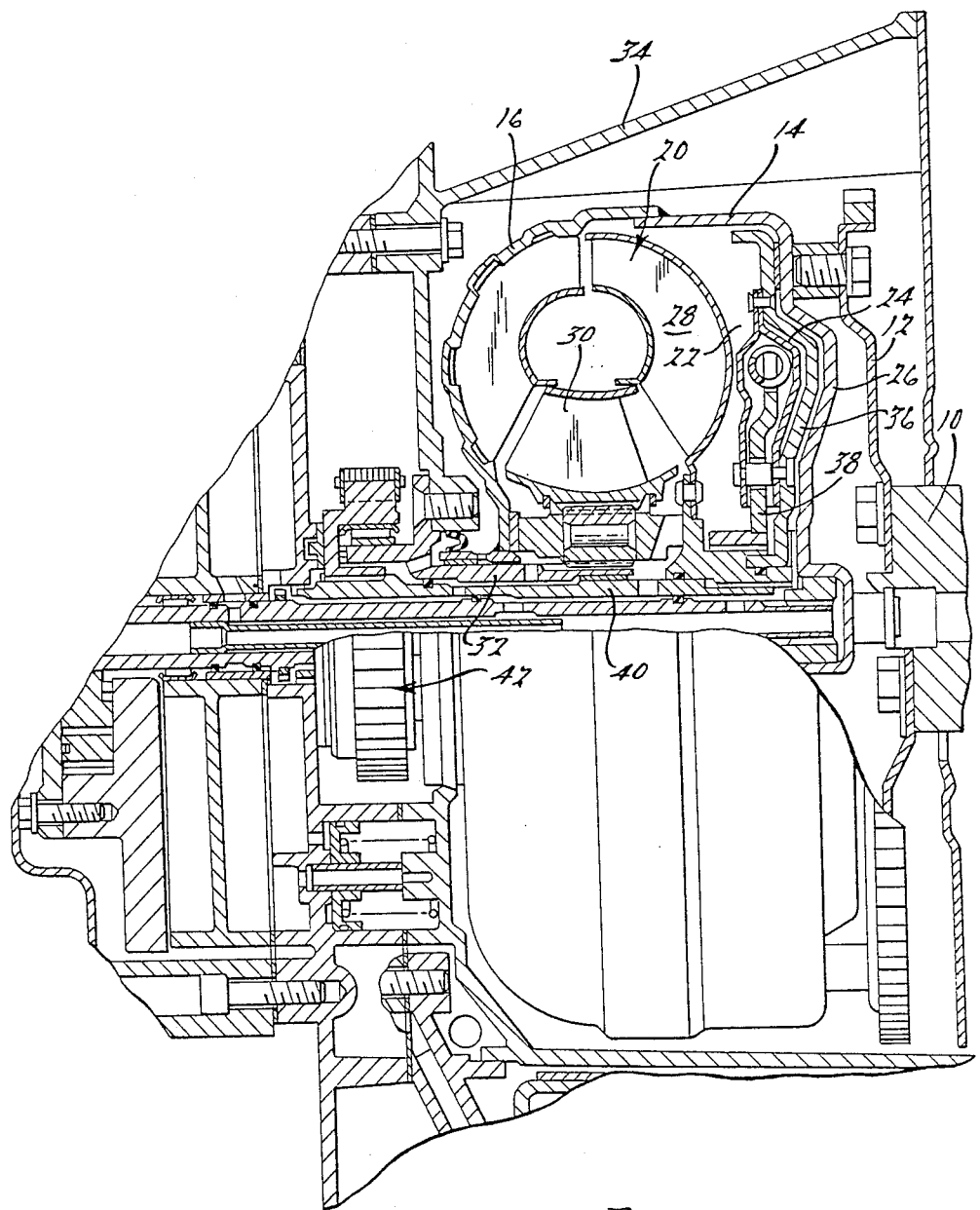
FIG. 1 shows a prior art torque converter and lockup clutch assembly wherein a friction clutch mechanism is disposed within the converter housing.

Numeral 10 in FIG. 1 designates an engine crankshaft. It is connected by drive plate 12 to a torque converter housing 14. The housing 14 is welded at its outer margin to an impeller housing 16 of a hydrokinetic torque converter 20.

A lockup clutch cavity 22 is formed in the converter housing 14. It contains a lockup clutch assembly 24 situated between housing wall 26 and turbine 28 of the converter 20.

Stator 30 is mounted by means of an overrunning brake and stator hub on stationary stator sleeveshaft 32 which is connected to the transmission housing 34.

The lock-up clutch assembly 24 includes a piston plate 36 and a damp assembly 38, the latter being splined to turbine shaft 40. A drive sprocket and chain assembly 42 is driven by the turbine shaft. The driven sprocket that registers with the drive chain is mounted on an axis parallel to the axis of the converter and serves as a torque input element for multiple ratio gearing, as taught by U.S. Pat. No. 4,509,389.

While control pressure is distributed between the piston plates 36 and the wall 26, the pressurized fluid flows radially outward across the friction surfaces at the margin of the piston plate, thereby disengaging the clutch. When the control pressure is reduced relative to the static pressure is the torus circuit of the converter, the clutch becomes applied.

FIG. 2 shows the improvements of my invention. It does not require the use of a piston plate of the kind shown in FIG. 1, and it does not require continuous flow of fluid that is subjected to a control pressure to disengage the clutch. Further, the piston acts to engage friction discs carried within the torus circuit where heat may be dissipated. In this respect, the heat transfer characteristics are improved over a design such as that shown in the '389 patent where the heat must be transferred into the converter housing.

In FIG. 2, the converter housing identified by numeral 44 includes a radial wall 46 that is bolted, as shown at 48, to a starter ring gear and drive plate assembly 50, the latter being bolted at 52 to the end of an engine crankshaft 54.

The outer margin of the converter housing is welded at 56 to impeller shell or housing 58. Impeller blades 60 are provided with tabs on their outer margins as shown at 62. These tabs register with blade retaining recesses in the interior wall of the impeller shell 58. The hub 64 of the impeller is journalled on stator sleeve shaft 66 which is connected to transmission housing 68. As in the case of the FIG. 1 construction, the converter includes a stator, as shown at 70. A stator hub 72 is splined to the outer race 74 of an overrunning brake. The inner race of overunning brake 76, is splined to stationary sleeve shaft 66 as shown at 78.

Converter turbine 80 includes an outer shroud 82 and radial inflow blades. The radially inward margin of the shroud 82 is secured to turbine hub 84, which is splined at 86 to turbine sleeve shaft 88.

A one-piece cylinder identified generally by numeral 90 includes an axial extension 92 which defines an annular sealing surface 94. It is formed also with an annular surface 96. The radially outward position of the cylinder is secured preferably by welding to the inner surface of the wall 46 as shown at 98.

Cylinder 90 is provided with a central opening 100 through which hub 102 extends. The hub is splined to a hydraulic pump drive shaft 104 of the kind described in the '389 patent, and it is sealed at 107 on an extension of the turbine hub 84.

Turbine shaft 88 and the drive shaft for the pump define an annular flow passage 106 which communicates with the control pressure cavity 108 through porting formed in the hub 102. The pressure cavity 108 is defined by the inner surface of the wall 46 and the cylinder 90.

A space 110 is provided between the cylinder 90 and the adjacent wall 46. It communicates with a clutch pressure chamber 112 through port 114.

An annular piston 116 is formed, preferably, by a stamping operation. It is provided with an axially extending first portion 118 which is in sliding and sealing engagement with surfaces 94 and a second axially extending portion 120 which is in sliding and sealing engagement with surface 96.

When pressure is distributed through control pressure passage 106 and into the space between the cylinder and the adjacent wall 46, a pressure buildup occurs in the chamber 112, thereby causing the piston 116 to stroke in a left-hand direction. The radially outward margin of the cylinder 90 is splined at 122 to provide a secure driving connection with reaction ring 124 and a pressure plate 126. A friction disc 128 having a friction surface on each side thereof at its outer margin is disposed between the reaction plate 124 and the pressure plate 126. The assembly of discs and plates is held axially fast by snap ring 130.

The clutch disc 128 is connected to the drive plate 131 of a damper assembly generally identified by reference numeral 132. The damper assembly includes a hub 134, which is splined to the turbine hub 84. For a description of a damper of this kind and its mode of operation, reference may be made to prior art U.S. Pat. Nos. 2,574,573 and 4,304,107.

The fluid that circulates through the torus circuit comes in direct contact with the clutch disc and the clutch plate, thereby providing adequate cooling during operation. It is possible to control the magnitude of the pressure in the working chamber 112 to effect a continuous slipping of the clutch, thereby damping torsional vibrations and transient engine torque changes during operation. The heat that is generated by the slipping of the clutch or by repeated application and release of the clutch is adequately dissipated in the fluid that is circulated through the torus circuit. That circuit includes a flow passage 136 formed in the stator sleeve shaft 60. The turbine hub can be ported, as shown at 138, to provide a torus circuit feed. Fluid is returned radially inward through port 139 formed in the impeller hub and in the stator hub. It then is returned to the transmission oil cooler through another passage, not shown.

My improved construction substantially reduces manufacturing costs and greatly simplifies the assembly of the converter and clutch assembly. Application and release of the clutch may be achieved without the necessity for increased converter flow as in constructions of the kind shown in the aforementioned '389 patent.

The extension 120 and 118 of the piston include recesses for annular seal rings. When they are arranged as shown in the assembly view of FIg. 2, the centrifugal force on the ring due to rotation of the impeller increases the sealing effort of the seal rings, thereby maintaining an adequate seal regardless of rotary speed. This is true both with the seal for extension 118 as well as for extension 120.

By eliminating the continuous flow of fluid in the clutch pressure chamber by providing a so-called deadhead passage, the clutch may be controlled more effectively with less transient capacity variation.

Having described a preferred form of my invention, what I claim and desire to secure by U.S. letters patent is:

1. A hydrokinetic torque converter and lockup clutch assembly for use with a power transmission mechanism adapted to deliver torque from a driving shaft to a driven shaft comprising:

a torque converter housing having a closed converter cavity and an interior wall disposed radially with respect to said driven shaft, said cavity enclosing a bladed impeller and a bladed turbine arranged in toroidal fluid flow relationship, said turbine being located within said coverter cavity between said driving shaft and said impeller;

said turbine including a turbine hub connected to said driven shaft;

a single piece cylinder member fixed to said housing extending radially with respect to said turbine hub to a radially outward location within said converter cavity, friction discs of a lockup clutch secured to said cylinder member at said outward location, said cylinder member having radially spaced annular surfaces extending axially;

an annular piston having axially extending portions defining annular surfaces registering with said annular surfaces fo said cylinder member, said cylinder member and said piston defining a pressure cavity;

a pressure distributor passage extending from a radially inward location adjacent said turbine hub and defined by said cylinder member and the interior wall of said housing, said distributor passage being in communication with said pressure cavity; and a driving clutch disc disposed adjacent said friction discs and connected to said driven shaft whereby said impeller and said turbine are locked together when said pressure cavity is pressurized;

said friction discs being secured to a portion of said cylinder member that is common to portions of said cylinder member that define said pressure cavity and said distributor passage;

said cylinder member annular surfaces comprising internal facing radially inward with respect to said driven shaft surfaces and the annular surfaces of said piston comprising surfaces, each radially outward facing surface facing radially outward with respect to said driven shaft having a seal groove, and an annular seal in each groove registering with one of said annular radially inward facing surfaces whereby centrifugal forces on each of said seals increase the sealing capacity of said annular seals.

2. The combination as set forth in claim 1, wherein said friction discs are secured to a portion of said cylinder member that is formed in one piece with portions of said cylinder member that define said pressure cavity and said distributor passage, said cylinder member portions forming a unitary part.

3. The combination as set forth in claim 1 wherein a portion of said cylinder member located between said radially spaced annular surfaces being apertured whereby fluid under clutch engaging pressure is distributed to the full radial extent of said pressure cavity.

* * * * *

UNITED STATES PATENT AND TRADEMARK OFFICE
CERTIFICATE OF CORRECTION

PATENT NO. : 4,949,822

DATED : August 21, 1990

INVENTOR(S) : Dale E. Martin

It is certified that error appears in the above-identified patent and that said Letters Patent is hereby corrected as shown below:

Column 2, line 3, delete "It" and substitute --If it--.

Column 2, line 35, delete "my" and substitute --My--.

Column 3, lines 8-9, delete "substracting" and substitute --subtracting--.

Column 4, line 20, after "90" and before "includes" insert --is made preferably by stamping operation. The cylinder--.

Column 6, lines 27-33:

line 27, delete "internal" insert --surfaces facing radially inward with respect to said driven shaft and the annular surfaces of said piston comprising surfaces facing radially outward with respect to said driven shaft, each radially outward facing surface having a seal groove,-- line 33, after 'said" delete "annular"
after "facing insert "annular"

Signed and Sealed this

Tenth Day of March, 1992

Attest:

HARRY F. MANBECK, JR.

Attesting Officer

Commissioner of Patents and Trademarks